United States Patent [19]

Pierini et al.

[11] Patent Number: 5,367,042
[45] Date of Patent: Nov. 22, 1994

[54] PROCESS FOR FABRICATING ORIENTED POLYBENZAZOLE FILMS

[75] Inventors: Peter E. Pierini, Berkeley; Robbert M. Vermeulen, Concord, both of Calif.; Susan E. Dollinger, Granville, Ohio

[73] Assignee: The Dow Chemical Company, Midland, Mich.

[21] Appl. No.: 937,327

[22] Filed: Aug. 27, 1992

[51] Int. Cl.$^5$ .................. C08G 75/32; C08G 73/22; C08J 5/00
[52] U.S. Cl. .................. 528/183; 528/172; 528/176; 528/179; 528/184; 528/185; 528/337; 264/184; 264/197; 264/204; 264/208; 264/210.2; 264/210.7; 264/216; 264/290.2; 264/331.11; 428/411.1
[58] Field of Search .............. 528/183, 337, 185, 176, 528/179, 184, 172; 264/184, 197, 208, 210.7, 290.2, 210.8, 331.11, 204, 216; 428/411.1

[56] References Cited

U.S. PATENT DOCUMENTS

| | | | |
|---|---|---|---|
| 4,051,108 | 9/1977 | Helminiak | 528/185 |
| 4,076,785 | 2/1978 | Schmidt | 264/210.7 |
| 4,229,566 | 10/1980 | Evers et al. | 528/185 |
| 4,293,517 | 10/1981 | Knox | 264/216 |
| 4,377,546 | 3/1983 | Helminiak | 528/183 |
| 4,388,258 | 6/1983 | Hungerford | 264/210.7 |
| 4,423,202 | 12/1983 | Choe | 528/183 |
| 4,487,735 | 12/1984 | Chenevey et al. | 528/351 |
| 4,533,693 | 6/1985 | Wolfe et al. | 528/176 |
| 4,803,027 | 2/1989 | Peiffer et al. | 264/210.7 |
| 4,847,350 | 7/1989 | Harris | 528/179 |
| 4,874,571 | 10/1989 | Müller | 264/216 |
| 4,898,924 | 2/1990 | Chenevey et al. | 528/337 |
| 4,939,235 | 7/1990 | Harvey et al. | 528/337 |
| 4,963,428 | 10/1990 | Harvey et al. | 528/193 |
| 4,966,806 | 10/1990 | Lusignea et al. | 428/220 |
| 4,973,442 | 11/1990 | Harvey et al. | 264/290.2 |
| 4,977,223 | 12/1990 | Arnold et al. | 264/331.11 |
| 5,158,637 | 10/1992 | Takashige et al. | 264/210.7 |

FOREIGN PATENT DOCUMENTS

| | | |
|---|---|---|
| 0472834 | 3/1992 | European Pat. Off. . |
| 61-28530 | 2/1986 | Japan . |
| 62-53339 | 3/1987 | Japan . |
| 63-74612 | 4/1988 | Japan . |
| 63-210138 | 8/1988 | Japan . |
| 1287141 | 11/1989 | Japan . |
| 8912072 | 12/1989 | WIPO . |
| 9003995 | 4/1990 | WIPO . |
| 9210527 | 6/1992 | WIPO . |

*Primary Examiner*—John Kight, III
*Assistant Examiner*—P. Hampton-Hightower

[57] ABSTRACT

Films containing polybenzazole polymer dissolved in a solvent can be mechanically stretched to provide biaxial orientation. The resulting dope film can be coagulated. The polymer film has improved properties in the direction in which stretching occurs.

23 Claims, No Drawings

PROCESS FOR FABRICATING ORIENTED POLYBENZAZOLE FILMS

BACKGROUND OF THE INVENTION

This invention relates to films containing polybenzazole polymers and processes for making them.

Polybenzazole polymers are typically synthesized by polymerization in non-oxidizing dehydrating acid solutions to form viscous dopes containing the acid and the polymer. Uniaxially oriented film may be synthesized from dope by extruding onto a rotating drum that draws the film in the machine direction and rotates it down into a water bath to coagulate. Biaxially oriented films are synthesized by extruding the dope as a tube, which is blown or forced over a mandrel to impart some biaxial orientation, and is then immersed in water to coagulate it. Examples of such processes are described in: Chenevey, U.S. Pat. No. 4,487,735 (Dec. 11, 1984); Lusignea et al., U.S. Pat. No. 4,871,595 (Oct. 3, 1989); Chenevey, U.S. Pat. No. 4,898,924 (Feb. 6, 1990); Harvey et al., U.S. Pat. No. 4,939,235 (Jul. 3, 1990); Harvey et al., U.S. Pat. No. 4,963,428 (Oct. 6, 1990); Lusignea et al., U.S. Pat. No. 4,966,806 (Oct. 30, 1990); and Fujiwara, Japanese Kokai 63(1988)-74612 (published Apr. 5, 1988), which are incorporated herein by reference.

Improvements are needed in the processes for making polybenzazole films. Films made by the previously described processes tend to have very inconsistent gauge thickness. The biaxial orientation is less than complete, so that films still tend to have better properties in the machine direction and poorer properties in the transverse direction. Moreover, the overall properties of the films are not very high. A new process for synthesizing biaxially oriented polybenzazole films is needed.

SUMMARY OF THE INVENTION

The present invention is a process for making a polybenzazole film or sheet comprising the steps of:

(1) extruding a dope that contains a solvent and a polybenzazole polymer selected from the group consisting of polybenzoxazole and polybenzothiazole polymer or copolymer, through a slit die wherein the faces of the die do not move substantially with respect to each other in a direction that is transverse to the direction of extrusion, whereby a dope film or sheet having transverse edges is formed;

(2) mechanically stretching the dope film or sheet in a direction that is approximately transverse to the direction in which the film was extruded, using a device that grips the transverse edges of the dope film or sheet and draws the transverse edges apart from each other at a temperature and a rate at which the dope film or sheet does not tear; and (3) coagulating the stretched dope film or sheet, whereby a polymer film or sheet is formed.

As used in this application, the term "transverse" means approximately at right angles with respect to the machine direction in which the dope film or sheet was extruded.

The mechanically stretched films and sheets may be used in structural materials or electronic components as described in U.S. Pat. No. 4,871,595 (Oct. 3, 1989) and 11 Ency. Poly. Sci. & Eng., *Polybenzothiazoles and Polybenzoxazoles*, 601 (J. Wiley & Sons 1988), which are incorporated herein by reference.

Mechanical stretching offers several advantages over the previously known processes. It offers superior gauge control for film gauge. Furthermore, mechanical stretching offers better control over the biaxial orientation of the film or sheet. The film can be stretched in the transverse direction alone or in both the machine direction and the transverse direction to provide a film having properties that are entirely balanced in the machine and transverse directions, are greater in the machine direction or are greater in the transverse direction.

DETAILED DESCRIPTION OF THE INVENTION

The present invention uses dopes containing polybenzoxazole (PBO) or polybenzothiazole (PBT) or copolymers thereof, dissolved in a solvent. PBO. PBT and random, sequential and block copolymers of PBO and PBT are described in references such as Wolfe et al., *Liquid Crystalline Polymer Compositions, Process and Products*, U.S. Pat. No. 4,703,103 (Oct. 27, 1987); Wolfe et al., *Liquid Crystalline Polymer Compositions, Process and Products*, U.S. Pat. No. 4,533,692 (Aug. 6, 1985); Wolfe et al., *Liquid Crystalline Poly(2,6-Benzothiazole)-Compositions, Process and Products*, U.S. Pat. No. 4,533,724 (Aug. 6, 1985); Wolfe, *Liquid Crystalline Polymer Compositions, Process and Products*, U.S. Pat. No. 4,533,693 (Aug. 6, 1985); Evers, *Thermoxadatively Stable Articulated p-Benzobisoxazole and p-Benzobisthiazole Polymers*, U.S. Pat. No. 4,359,567 (Nov. 16, 1982); Tsai et al., *Method for Making Heterocyclic Block Copolymer*, U.S. Pat. No. 4,578,432 (Mar. 25, 1986); 11 Ency. Poly. Sci. & Eng., *Polybenzothiazoles and Polybenzoxazoles*, 601 (J. Wiley & Sons 1988) and W. W. Adams et al., *The Materials Science and Engineering of Rigid-Rod Polymers* (Materials Research Society 1989), which are incorporated herein by reference.

The polymer may contain AB-mer units, as represented in Formula 1(a), and/or AA/BB-mer units, as represented in Formula 1(b)

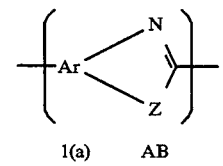

1(a)   AB

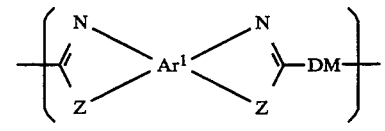

1(b)   AA/BB wherein:

Each Ar represents an aromatic group. The aromatic group may be heterocyclic, such as a pyridinylene group, but it is preferably carbocyclic. The aromatic group may be a fused or unfused polycyclic system, but is preferably a single six-membered ring. Size is not critical, but the aromatic group preferably contains no more than about 18 carbon atoms, more preferably no more than about 12 carbon atoms and most preferably no more than about 6 carbon atoms. Examples of suitable aromatic groups include phenylene moieties, tolylene moieties, biphenylene moieties and bis-phenylene ether moieties. $Ar^1$ in AA/BB-mer units is preferably a 1,2,4,5-phenylene moiety or an analog thereof. Ar in AB-mer units is preferably a 1,3,4-phenylene moiety or an analog thereof.

Each Z is independently an oxygen or a sulfur atom.

Each DM is independently a bond or a divalent organic moiety that does not interfere with the synthesis, fabrication or use of the polymer. The divalent organic moiety may contain an aliphatic group, which preferably has no more than about 12 carbon atoms, but the divalent organic moiety is preferably an aromatic group (Ar) as previously described. It is most preferably a 1,4-phenylene moiety or an analog thereof.

The nitrogen atom and the Z moiety in each azole ring are bonded to adjacent carbon atoms in the aromatic group, such that a five-membered azole ring fused with the aromatic group is formed.

The azole rings in AA/BB-mer units may be in cis- or trans-position with respect to each other, as illustrated in 11 Ency. Poly. Sci. & Eng., supra, at 602, which is incorporated herein by reference.

The polymer preferably consists essentially of either AB-PBZ mer units or AA/BB-PBZ mer units, and more preferably consists essentially of AA/BB-PBZ mer units. The polybenzazole polymer may be rigid rod, semi-rigid rod or flexible coil. It is preferably a lyotropic liquid-crystalline polymer, which forms liquid-crystalline domains in a solution when its concentration exceeds a "critical concentration point." It is preferably rigid rod in the case of an AA/BB-PBZ polymer or semi-rigid in the case of an AB-PBZ polymer. Azole rings within the polymer are preferably oxazole rings (Z=O). Preferred mer units are illustrated in Formulae 2(a)–(g). The polymer more preferably consists essentially of mer units selected from those illustrated in 2(a)–(g), and most preferably consists essentially of a number of identical units selected from those illustrated in 2(a)–(c).

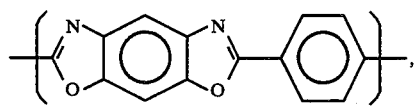  (a)

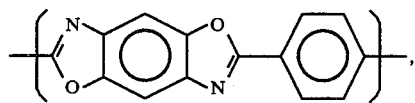  (b)

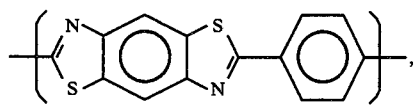  (c)

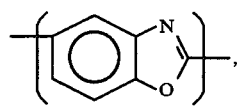  (d)

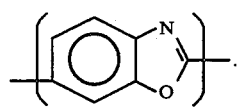  (e)

Each polymer preferably contains on average at least about 25 mer units, more preferably at least about 50 mer units and most preferably at least about 100 mer

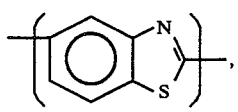  (f)

and

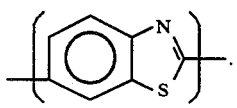  (g)

units. The intrinsic viscosity of rigid AA/BB-PBZ polymers in methanesulfonic acid at 25° C. is preferably at least about 10 dL/g, more preferably at least about 15 dL/g and most preferably at least about 20 dL/g. For some purposes, an intrinsic viscosity of at least about 25 dL/g or 30 dL/g may be best. Intrinsic viscosity of 60 dL/g or higher is possible, but the intrinsic viscosity is preferably no more than about 40 dL/g. The intrinsic viscosity of semi-rigid AB-PBZ polymers is preferably at least about 5 dL/g, more preferably at least about 10 dL/g and most preferably at least about 15 dL/g.

The polymer or copolymer is dissolved in a solvent to form a solution or dope. Some polybenzoxazole and polybenzothiazole polymers are soluble in cresol, but the solvent is preferably an acid capable of dissolving the polymer. The acid is preferably non-oxidizing. Examples of suitable acids include polyphosphoric acid, methanesulfonic acid and sulfuric acid, and mixtures of those acids. The acid is preferably polyphosphoric acid or methanesulfonic acid, and is more preferably polyphosphoric acid.

The dope should contain a high enough concentration of polymer for the polymer to coagulate to form a film of the desired thickness without substantial flaws. When the polymer is a lyotropic liquid-crystalline, then the concentration of polymer in the dope is preferably high enough to provide a liquid crystalline dope. The concentration of the polymer is preferably at least about 7 weight percent, more preferably at least about 10 weight percent and most preferably at least about 14 weight percent. The maximum concentration is limited primarily by practical factors, such as polymer solubility and dope viscosity. The concentration of polymer is seldom more than 30 weight percent, and usually no more than about 20 weight percent.

Suitable polymers or copolymers and dopes can be synthesized by known procedures, such as those described in Wolfe et al., U.S. Pat. No. 4,533,693 (Aug. 6, 1985); Sybert et al., U.S. Pat. No. 4,772,678 (Sep. 20, 1988); Harris, U.S. Pat. No. 4,847,350 (Jul. 11, 1989); and Ledbetter et al., "An integrated Laboratory Process for Preparing Rigid Rod Fibers from the Monomers," *The Materials Science and Engineering of Rigid-Rod Polymers* at 253–64 (Materials Res. Soc. 1989), which are incorporated herein by reference. In summary, suitable monomers (AA-monomers and BB-monomers or AB-monomers) are reacted in a solution of nonoxidizing and dehydrating acid under nonoxidizing atmosphere with vigorous mixing and high shear at a temperature that is increased in step-wise or ramped fashion from no more than about 120° C. to at least about 190° C. Examples of suitable AA-monomers include terephthalic acid and analogs thereof. Examples of suitable BB-monomers include 4,6-diaminoresorcinol, 2,5-diaminohydroquinone. 2,5-diamino-1,4-dithiobenzene and analogs thereof, typically stored as acid salts. Examples of suitable AB-monomers include 3-amino-4-hydroxybenzoic acid, 3-hydroxy-4-aminobenzoic acid, 3-amino-4-thiobenzoic acid, 3-thio-4-aminobenzoic acid and analogs thereof, typically stored as acid salts.

The present invention converts dopes into polymer films by a three-step process. In the first step, the dope is extruded as a dope film or sheet which is relatively thick and is relatively narrow in the transverse direction, as compared with the final desired film. The extrusion is through a slit die, such as a coathanger die or T-die. The faces of the die should not move substantially with respect to each other in a direction that is transverse to the direction of extrusion. Most ordinary slit dies meet this criterion. Transverse movement of die faces has been used in the art to orient different faces of the film in different directions by application of different transverse shear to different faces of the film. See, e.g., Lusignea, U.S. Pat. No. 4,966,806 (Oct. 30, 1990); Chenevey, U.S. Pat. No. 4,898,924 (Feb. 6, 1990), and Nagasawa et al., Japanese Kokai 53(1978)-47460 (Apr. 27, 1978), which are incorporated herein by reference. It is undesirable in the present invention to apply such differing transverse shear to different faces of the dope film. The extruded dope film is preferably left as a continuous sheet, rather than cutting into discrete sections. The dope film should not be coagulated.

Optimal extrusion temperature varies according to many factors such as polymer rigidity, molecular weight and concentration, and dope viscosity. The extrusion temperature for liquid crystalline dopes of about 14 weight percent cis-polybenzoxazole in polyphosphoric acid is preferably at least about 100° C., more preferably at least about 130° C., and most preferably at least about 160° C. It is preferably no more than about 260° C., more preferably no more than about 230° C. and most preferably no more than about 200° C.

The dope film or sheet should be thick enough that it can be stretched as desired without leaving flaws after coagulation. The optimum thickness varies considerably depending upon the desired thickness of the final product and the desired stretch from the second step of the process. For most purposes, the dope film or sheet is preferably at least about 1 mil thick, more preferably at least about 5 mil thick and most preferably at least about 25 mil thick. The dope film or sheet is preferably no more than about 250 mil thick and more preferably at most about 100 mil thick. (Ordinarily, the term "film" refers to an article no more than about 10–15 mil thick, and the term "sheet" refers to an article at least about 10–15 mil thick. In the interest of brevity, this Application shall use the term "film" to refer to both film and sheet.)

It may optionally be desirable to extrude the dope film between two layers of a stretchable polymer film which is inert with respect to the dope under process conditions. Examples of a suitable polymer film include Teflon TM fluorocarbon film and amorphous polyester film. The outer layers protect the dope from the atmosphere and prevent it from adhering itself or other objects if the dope is stored after extrusion.

The faces of the dope sheet should not be subjected to transverse shear after they are extruded before stretching.

In the second step, the dope film is mechanically stretched in at least the transverse direction. A mechanical device grips the transverse edges of the dope film and pulls the transverse edges apart. The dope film may also be stretched in the machine direction and/or in any other direction. If the dope is stretched in multiple directions, then the stretching may be in a single direction at a time or may be simultaneous in two or more directions. Ordinarily, stretching increases the tensile strength and modulus of the finished film in the direction stretched, but slightly decreases those same properties perpendicular to the directions stretched.

Individual sheets of dope film may be stretched in a batch fashion using commercially available equipment such as the T.M. Long TM Film Stretcher, available from T.M. Long Co. Mechanical stretching is preferably carried out on a tentering apparatus, which continuously stretches a continuous dope film.

The dope film is tentered in a manner similar to known thermoplastic polymers. Ordinarily, the dose film travels continuously through a tentering device. Near the front of the device, gripping means such as clips grip the transverse edges of the dope film. As the dope film travels through the tentering device, the gripping means move further apart, drawing the transverse edges of the dope film further apart. The tentering device may have zones, in which no stretching occurs, before and/or after the stretching zone. Examples of tentering equipment and procedures are described in numerous literature references, such as Young, U.S. Pat. No. 2,473,404 (Jun. 14, 1949); Minich, U.S. Pat. No. 2,3342022 (Nov. 9, 1943); Milne, U.S. Pat. No. 2,618,012 (Nov. 8, 1952); Tomlinson, U.S. Pat. No. 3,571,846 (Mar. 23, 1971); Levy et al., U.S. Pat. No. 4,104,769 (Aug. 8, 1978) and Kwack, U.S. Pat. No. 4,862,564 (Sep. 5, 1989), which are incorporated by reference. Tentering devices are also commercially available from sources such as Marshall & Williams Co., Bruckner Machinery Corp., and Crown Products. The materials that come in contact with dope should be inert with respect to the dope under process conditions.

Some tentering machines are known which can simultaneously stretch film in the machine direction and the transverse direction. Alternatively, equipment that stretches film in the machine direction, such as a series of rollers moving at different speeds, may be placed on the film line before or after the tentering apparatus.

Stretching transversely improves the transverse tensile properties of the film after the dope is coagulated. The transverse tensile strength and modulus increase with greater stretch, and the machine direction tensile strength and modulus decline slightly with greater transverse stretch (except when the dope is also stretched in the machine direction). The extruded film is preferably stretched to at least about 1.5 times its original transverse width, highly preferably at least about 2 times, more preferably at least about 3 times, more highly preferably at least about 4 times and most preferably at least about 5 times. The same stretching may be applied in the machine direction. The film may be stretched to as much as 7 times its original length and/or width or more.

Stretching should be carried out at a temperature and at a rate at which the dope film can stretch without tearing. Liquid crystalline dope films containing polymer dissolved in polyphosphoric acid may exhibit a phase change similar to a glass-transition temperature. The temperature of stretching is preferably not below about 5° C.–10° C. below the glass-transition temperature, and is more preferably at least about the glass transition temperature. The maximum temperature of stretching should be low enough that the dope film is stable. It is preferably low enough to minimize sagging of the dope film during stretching. The temperature of stretching is preferably no more than about 105° C. above the "glass-transition temperature" of the dope, more preferably no more than about 55° C. above and most preferably no more than about 5° C. above.

For liquid crystalline dopes containing polyphosphoric acid (82%–84% $P_2O_5$) and 14 weight percent rigid rod polybenzoxazole or polybenzothiazole, the temperature for tentering is preferably at least about 20° C., more preferably at least about 50° C. and most preferably at least about 75° C. It is preferably at most about 175° C., more preferably at most about 150° C. and most preferably at most about 125° C. The optimal rate of stretching varies widely depending upon a number of factors such as polymer structure, molecular weight and concentration, solvent acid and dope temperature. It can best be determined by experiment.

In the third step, the stretched dope film is coagulated to yield a polybenzazole film. Ordinarily the stretched dope film is coagulated by contacting the film with a liquid that is a nonsolvent for the polymer and a diluent for the solvent. The coagulating liquid may be organic, such as methanol, but it is preferably aqueous. The aqueous coagulant may be basic or slightly acidic, but is preferably about neutral. If the dope was extruded and stretched between water-impermeable polymer face films, then the films should be stripped off of at least one side before coagulating. If the dope was extruded and tentered between water-permeable films, then the entire structure may be immersed to initially coagulate the film, although at least one face sheet is preferably stripped off after the initial coagulation in order to facilitate washing out residual solvent.

If the solvent contains a volatile component, such as methanesulfonic acid, then the polymer may optionally be concentrated by evaporating the solvent. Preferably, the volatile component is not stripped off to the point that the polymer coagulates. Instead, the concentrated dope is still preferably contacted with a nonsolvent to coagulate the polymer.

After coagulation the polybenzazole film is preferably washed for a period of time to substantially remove residual solvent. It is preferably dried under restraint to prevent it from curling or shrinking.

The coagulated film may optionally be densified by heat treatment. The heat treatment is preferably under pressure. It is preferably at a temperature of at least about 150° C., and more preferably at a temperature of at least about 250° C.

The previously described steps may be integrated into a single continuous process in which the dope is extruded to form an extruded film, the extruded film passes into a tentering machine, and the tentered film is coagulated within the tentering machine or afterwards. The continuous process might optionally further contain an apparatus to stretch the dope film in the machine direction before or after tentering. Alternatively, one or more of the steps may be broken apart from the others. For instance, the extruded film may be taken up on a roll and stored until ready for tentering. The tentered film may be stored or further processed before coagulation. Two or more layers of tentered film may be pressed together to form a thicker sheet before coagulating. Reinforcing fibers may be pressed into a tentered film before coagulation to form a prepreg. A tentered film may be placed over a mold or form before coagulation.

The film recovered from the present process contains polybenzazole polymer as previously described, and preferably consists essentially of polybenzazole polymer. It may be very thin, for instance suitable for membrane purposes, or thicker to be suitable for structural purposes. It is preferably at least about 0.1 mil thick, and more preferably at least about mil thick. It preferably has an average thickness variation of no more than about 5 percent, more preferably no more than about 0.5 percent.

The optimal properties of the finished polybenzazole film will vary depending upon its intended use. For most structural purposes, the film preferably has an average tensile strength in at least one direction of at least about 25 Ksi (1 Ksi=$10^3$ psi), more preferably at least about 60 Ksi, and most preferably at least about 88 Ksi. It preferably has an average tensile modulus in at least one direction of at least about 3 Msi (1 Msi=$10^6$ psi), more preferably at least about 5 Msi, and most preferably at least about 8 Msi.

The average tensile strength of the film in the transverse direction is preferably at least about 35 Ksi, more preferably at least about 50 Ksi, more highly preferably at least about 60 Ksi, and most preferably at least about 70 Ksi. The average tensile modulus of the film in the transverse direction is preferably at least about 3 Msi, more preferably at least about 5 Msi, more highly preferably at least about 6 Msi and most preferably at least about 8 Msi.

One reason that mechanical stretching is advantageous is that the degree of stretch in each direction may easily be selected. For instance, the film may be stretched in the transverse direction with essentially no stretch in the machine direction. Alternatively, the film may be stretched in the machine and transverse directions in almost any ratio that the dope and equipment will permit, from essentially equal to much greater stretch in the machine or transverse directions.

Because mechanical stretching permits a wide variety of stretching, the films made using mechanical stretching may have a wide variety of tensile properties. The tensile strength and/or tensile modulus of the film may be at least as high in the transverse direction as it is in the machine direction. For instance, the average tensile strength and/or tensile modulus in the machine and transverse directions preferably differ by no more about 10 percent in a film with balanced properties, and more preferably differ by no more than about 5 percent. Alternatively, the tensile strength or modulus may be substantially higher in either the machine direction or the transverse direction in a film with unbalanced properties.

It is theorized that films produced by mechanical stretching are also structurally different from films produced by prior art processes. Films that are made by extruding a tube from a rotating or counter-rotating die and blowing the tube are theorized to contain a plurality of planes. The polymer in each plane is uniaxially oriented (anisotropic in the x-y plane parallel to the plane of the film), but the planes are oriented in different directions (anisotropic in the z direction perpendicular to the major plane of the film). See Lusignea, "Film Processing and Applications for Rigid-Rod Polymers", The Materials Science and Engineering of Rigid-Rod Polymers at 256 (Materials Research Society 1989). For instance, films made by the processes disclosed in U.S.

Pat. Nos. 4,898,924: 4,939,235; 4,963,428; and 4,966,806 contain polymer oriented in a first direction on one face, polymer oriented in a second direction on the other face, and a middle layer in which the polymer is substantially non-oriented.

On the other handy it is theorized that films which are extruded through a slit die and mechanically stretched do not contain a plurality of discrete layers, but are substantially isotropic in the z direction. The film preferably does not contain discreet layers that are oriented in a uniform angle of + or $-\theta$ with respect to the machine direction of extrusion. This distinction may be advantageous in minimizing curling and/or delamination of the film with changing temperature.

The films are useful as coatings or structural materials or membranes are electronic substrates.

The process of the present invention is more specifically illustrated in the following Examples.

ILLUSTRATIVE EXAMPLES

The following examples are given to illustrate the invention and should not be interpreted as limiting the Specification or the claims. Unless stated otherwise, all parts and percentages are given by weight.

Example 1—Batch Mechanical Stretching

A solution of polyphosphoric acid (85 weight percent $P_2O_5$) containing 14 weight percent cis-polybenzoxazole (about 25–40 intrinsic viscosity in methanesulfonic acid at 25° C.) is extruded through a 6-inch wide slit die with a 0.005 inch gap using a ram extruder. The barrel temperature in the extruder is 180° C. and the die temperature is 160° C. The speed of extrusion is 6.5 cm³/min. The dope film is taken up between two films of skived polytetrafluoroethylene (PTFE) that are 0.003 in. thick. The resulting product is a sandwich containing 0.006–0.007 in. of PBO between the PTFE films.

Several 4⅜ in. by 4⅜ in. samples are cut from the film. The samples are placed one at a time in a T. M. Long mechanical stretcher having an air temperature of about 140° C. and a plate temperature of about 125° C. The samples are held for 30 seconds to equilibrate temperature, and then are stretched in the transverse direction or the machine direction or both at a rate of 2 in./sec. until a desired stretch ratio is achieved. The samples are cooled with an air gun and recovered.

The PTFE films are stripped off of each side of each sample. Each dope film is clamped on a steel and immersed in deionized water for 48 hours. Each sample is then dried on the hoop at 300° C. for 1.5 hr. Dog-bone shaped test samples are cut from each sample and tested for tensile strength and tensile modulus in the transverse direction. The test method is set out in ASTM D 882-83. The tensile measurements are made using an Instron ™ tensile tester. The results are set out in Table 1. The batch stretching is recognized as a bench-scale approximation of performance in a continuous tentering apparatus.

TABLE 1

| Transverse Stretch Ratio | Transverse Tensile Strength (KSI) | Transverse Tensile Modulus (KSI) |
|---|---|---|
| 1:1 | 11.7 | 591 |
| 1:1 | 12.4 | 676 |
| 1:1 | 12.6 | 671 |
| 2.0:1 | 15.5 | 811 |

TABLE 1-continued

| Transverse Stretch Ratio | Transverse Tensile Strength (KSI) | Transverse Tensile Modulus (KSI) |
|---|---|---|
| 2.5:1 | 21.7 | 1262 |
| 3.0:1 | 24.4 | 1725 |
| 3.5:1 | 24.4 | 1858 |

Example 2—Batch Mechanical Stretching of PBO Film

A dope containing 14 weight percent rigid rod cis-polybenzoxazole (I.V. about 20–40 dL/g) and polyphosphoric acid (About 82–84% $P_2O_5$) is extruded through a six-inch slit die with a barrel temperature of 180° C. and a die temperature of 160° C. The film crosses and air gap. Each dope film is sandwiched between two face sheets of 15 mil amorphous polyester (PETG) (KODAR ™ 6763 film). The multilayer structure is taken up upon a roll at a variable speed to provide variable draw upon film across the air gap. The conditions for extrusion are set out in Table 2(A).

The dope film is cut into samples of about 4 in.×about 4 in. Each sample is stretched either uniaxially or biaxially on a T. M. Long ™ film stretcher at a rate of 2 in./sec with a plate temperature of about 105° C. and an air temperature of about 90° C. The stretching ratio in the machine and transverse directions are set out in Table 2(A) and Table 2(B). For instance, 1×2 means that the sample was stretched to 2 times its original width in the transverse direction and was not stretched in the machine direction, whereas 3×3 means that the sample was stretched to 3 times its original width in the transverse direction and to 3 times its original length in the machine direction.

Stretched samples are cooled and coagulated. The samples are coagulated by immersing the entire multilayer structure for about 4 hours then stripping off the face sheets and immersing in water for 24 hours. Dog bone shape test samples are cut in both the transverse and machine directions and tested for tensile strength and modulus as described in Example 1. The results are set out in Table 2(B).

TABLE 2(A)

| Sample | Barrel Press. (psi) | Die Press. (psi) | Die Gap (in.) | Draw Rate (cm/min) | Stretch Ratio |
|---|---|---|---|---|---|
| 1 | 2120 | 650 | 0.010 | 12.15 | 1 × 2 |
| 2 | 3090 | 690 | 0.005 | 20.19 | 2 × 2① |
| 3 | 2120 | 650 | 0.010 | 12.15 | 2 × 2② |
| 4 | 2120 | 650 | 0.010 | 12.15 | 1 × 3 |
| 5 | 2240 | 660 | 0.010 | 63.45 | 1 × 3 |
| 6 | 2200 | 680 | 0.010 | 28.70 | 1 × 3 |
| 7 | 2120 | 650 | 0.010 | 12.15 | 3 × 3① |
| 8 | 2120 | 650 | 0.010 | 12.15 | 2 × 3.5② |
| 9 | 1200–1300 | 230 | 0.040 | 6.60 | 3 × 5② |
| 10 | 2120 | 650 | 0.010 | 12.15 | 4 × 4① |

①stretch in machine and transverse directions simultaneously
②stretch in machine and transverse directions sequentially

TABLE 2(B)

| Sample | Stretch Ratio | MD Tensile Strength (KSI) | TD Tensile Strength (KSI) | MD Tensile Modulus (MSI) | TD Tensile Modulus (MSI) |
|---|---|---|---|---|---|
| 1 | 1 × 2 | 60.7 | 38.4 | 3.28 | 2.14 |
| 2 | 2 × 2① | 60.9 | 39.7 | 4.01 | 2.26 |
| 3 | 2 × 2② | 65.3 | 58.0 | 4.29 | 3.31 |

TABLE 2(B)-continued

| Sample | Stretch Ratio | MD Tensile Strength (KSI) | TD Tensile Strength (KSI) | MD Tensile Modulus (MSI) | TD Tensile Modulus (MSI) |
|---|---|---|---|---|---|
| 4 | 1 × 3 | 35.2 | 71.3 | 2.18 | 5.69 |
| 5 | 1 × 3 | 34.6 | 34.4 | 3.55 | 8.27 |
| 6 | 1 × 3 | 42.5 | 43.8 | 3.04 | 2.91 |
| 7 | 3 × 3① | 88.5 | 14.4 | 5.27 | 1.16 |
| 8 | 2 × 3.5② | 46.8 | 41.2 | 2.84 | 2.25 |
| 9 | 3 × 5② | 55.7 | 65.1 | 3.71 | 4.36 |
| 10 | 4 × 4① | 17.3 | 46.4 | 2.32 | 4.85 |

①stretch in machine and transverse directions simultaneously
②stretch in machine and transverse directions sequentially

Example 3—Tentering of PBO film

A solution containing 14 weight percent polybenzoxazole in polyphosphoric acid (84% $P_2O_5$) is extruded through a 6-inch slit die with a 0.020-inch gap. The extruder temperature is 160° C., and the die temperature is 180° C. The extrusion speed is 9.4 cm$^3$/min. The extruded dope travels across an air gap and is taken up between two 0.015 in sheets of amorphous polyester film to form a multilayered structure.

The multilayered structure is tentered a: a temperature of about 85° C.-87° C. and a rate of about 5 ft/min. to stretch it about 4 times in the transverse direction. The stretched film is coagulated and dried as described in Examples 1 and 2. It is heated at 300° C. for 1½ hours before removing from the drying hoops. The tensile properties are tested as described in Example 1. The tensile strength of the film is about 42.6 Ksi in the machine direction and about 69.9 Ksi in the transverse direction. The tensile modulus of the film is about 2.03 Msi in the machine direction and about 4.16 Msi in the transverse direction.

Example 4—Tentering of PBO film

The procedure of Example 3 is followed except as follows:

(1) The extruder temperature is about 160° C. and the extrusion speed is about 10.2 cm$^3$/min;
(2) The film is drawn to three times its original length in the machine direction before tentering by drawing between a slow draw roller moving at 4 ft./min. and a fast draw roller moving at 12 ft./min. at a temperature of about 90° C.: and
(3) The resulting film is tentered in the transverse direction to 5 times its width at the completion of the machine direction stretch.

The tensile strength of the film is about 55.7 Ksi in the machine direction and about 65.1 Ksi in the transverse direction. The tensile modulus of the film is about 3.71 Msi in the machine direction and about 4.36 Msi in the transverse direction.

Example 5—PBO Film

A solution containing 14 weight percent polybenzoxazole in polyphosphoric acid (83 to 85% $P_2O_5$) is extruded through a 6-inch slit die with a 0.030-inch gap. The extruder temperature is 160° C., and the die temperature is 160° C. The extrusion speed is 10.2 cm$^3$/min. The extruded dope travels across an air gap and is taken up between two 0.003 inch thick sheets of skived PTFE to form a multilayered structure.

The multilayered structure is cut into 3.5 inches by 3.5 inches squares. The PTFE sheets are removed an each dope film sample is stretched simultaneously in the machine and transverse directions. The stretch ratio, temperature and speed are shown in Table 3 using an Iwamoto biaxial stretcher Model No. BIX-703. Each sample is heated for 90 seconds to the proper temperature before stretching and is quenched in water at room temperature after stretching. The samples are clamped on 16 inch diameter steel hoops, immersed in deionized water for at least hours, dried at 95° C. for 4 hours, and heated at 300° C. for 1.5 hours.

TABLE 3(A)

| Sample | Stretch Ratio | Stretch Temp (°C.) | Stretch Speed (mm/sec) | Polymer Film Thickness (mm) |
|---|---|---|---|---|
| 11 | 4 by 4 | 101 | 40 | 690–760 |
| 12 | 4 by 4 | 139 | 60 | 580–710 |
| 13 | 4 by 4 | 135 | 20 | 690–760 |
| 14 | 5 by 5 | 135 | 20 | 610–660 |
| 15 | 5 by 5 | 135 | 20 | 660–810 |

The tensile properties of the films are measured and set out in Table 3(B).

TABLE 3(B)

| Sam | MD Tens. Str. (KSI) | TD Tens. Str. (KSI) | MD Tens. Mod. (MSI) | TD Tens. Mod. (MSI) | MD Tens. Str. (MPa) | TD Tens. Str. (MPa) | MD Tens. Mod. (GPa) | TD Tens. Mod. (GPa) |
|---|---|---|---|---|---|---|---|---|
| 11 | 114 | 75.3 | 8.57 | 6.16 | 785 | 519 | 59.1 | 42.5 |
| 12 | 107 | 71 | 8.81 | 4.84 | 738 | 490 | 60.8 | 33.4 |
| 13 | 105 | 69 | 8.56 | 5.58 | 724 | 480 | 59.0 | 38.5 |
| 14 | 94.5 | 78.6 | 7.35 | 7.45 | 651 | 541 | 50.7 | 51.4 |
| 15 | 75.7 | 64.2 | 5.63 | 5.04 | 522 | 443 | 38.8 | 34.8 |

What is claimed is:

1. A process for preparing an oriented polybenzazole film or sheet comprising the steps of:

(1) extruding a dope to form a dope film or sheet, that contains: (a) a polybenzazole polymer selected from the group consisting of polybenzoxazole and polybenzothiazole polymer or copolymer and (b) a solvent capable of dissolving the polybenzazole polymer, through a slit die wherein the faces of the die do not move substantially with respect to each other in a direction that is transverse to the direction of extrusion, whereby a dope film or sheet having transverse edges is formed;

(2) stretching the dope film or sheet in a direction that is approximately the transverse to the direction in which the film was extruded, using a device that grips the transverse edges of the dope film or sheet and draws the transverse edges apart from each other at a temperature and a rate at which the dope film or sheet does not tear; and (3) coagulating the stretched dope film or sheet, whereby a polymer film or sheet is formed.

2. The process of claim 1 wherein the dope film or sheet is stretched to at least about 1.5 times its original width in the direction about transverse to the machine direction in which it was extruded in step (1).

3. The process of claim 2 wherein the solvent is polyphosphoric acid.

4. The process of claim 3 wherein the dope film or sheet is stretched to at least about 3 times its original width in the direction about transverse to the machine direction in which it was extruded in step (1).

5. The process of claim 3 wherein the stretching is carried out at a temperature of at least about 50° C.

6. The process of claim 3 wherein the dope contains at least about 7 weight percent polymer.

7. The process of claim 3 wherein the dope is a liquid crystalline dope.

8. The process of claim 3 wherein the polymer consists essentially of mer units independently selected from the group represented by the Formulae:

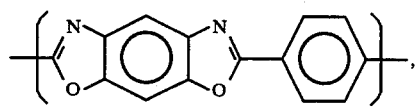
(a)

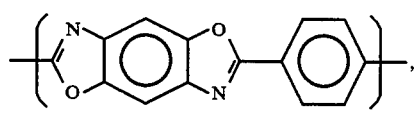
(b)

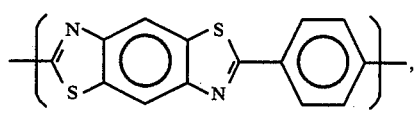
(c)

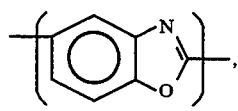
(d)

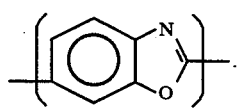
(e)

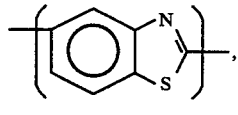
(f)

and

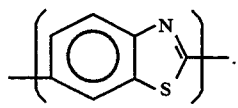
(g)

9. The process of claim 3 wherein the dope film or sheet is stretched while it is between two films made of a stretchable thermoplastic polymer.

10. The process of claim 1 wherein the device in step (2) is a tentering apparatus.

11. The process of claim 10 wherein the dope film or sheet is stretched to at least about 1.5 times its original width in the direction about transverse to the machine direction in which it was extruded in step (1).

12. The process of claim 11 wherein the solvent is polyphosphoric acid.

13. The process of claim 12 wherein the dope film or sheet is stretched to at least about 3 times its original width in the direction about transverse to the machine direction in which it was extruded in step (1).

14. The process of claim 13 which further comprises stretching the dope film or sheet to at least about 2 times its original length in the machine direction after step (1) and before step (3).

15. The process of claim 12 wherein the film or sheet is stretched to at least about 4 times its original width in the direction about transverse to the machine direction in which it was extruded in step (1).

16. The process of claim 12 wherein the polymer consists essentially of mer units independently selected from the group represented by the Formulae:

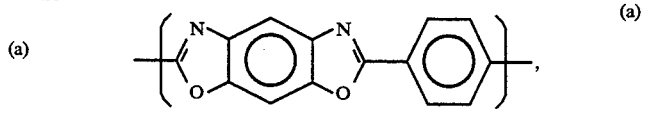
(a)

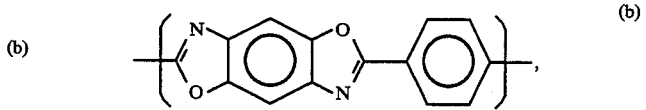
(b)

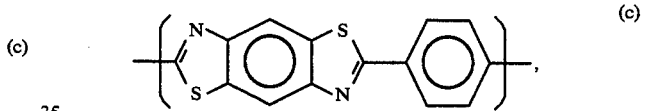
(c)

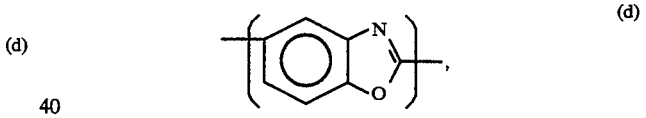
(d)

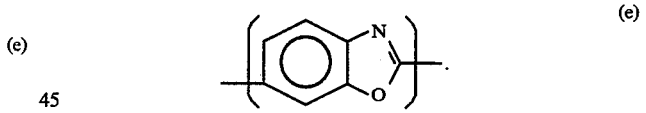
(e)

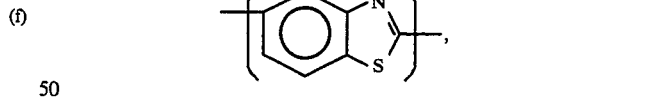
(f)

and

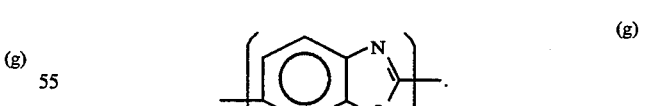
(g)

17. The process of claim 16 wherein the polymer that has an intrinsic viscosity of at least about 20 dL/g in methanesulfonic acid at 25° C., and consists essentially of mer units independently selected from the group represented by the Formulae:

18. The process of claim 16 wherein the dope film or sheet is liquid crystalline.

19. The process of claim 18 wherein the stretching is carried out a temperature of at least about 50° C. and no more than about 175° C.

20. The process of claim 12 wherein the dope film or sheet is coagulated by contacting it with an aqueous coagulant.

21. The process of claim 12 wherein the dope film or sheet is stretched about equally in the machine direction and in the transverse direction.

22. The process of claim 12 wherein the dope film or sheet is stretched more in the machine direction than in the transverse direction.

23. The process of claim 12 wherein the dope film or sheet is stretched more in the transverse direction than in the machine direction.

* * * * *

UNITED STATES PATENT AND TRADEMARK OFFICE
CERTIFICATE OF CORRECTION

PATENT NO. : 5,367,042
DATED : Nov. 22, 1994
INVENTOR(S) : Peter E. Pierini, Robbert M. Vermeulen, and Susan E. Dollinger It is certified that error appears in the above-indentified patent and that said Letters Patent is hereby corrected as shown below:

Col. 14, line 63, after Formulae insert:

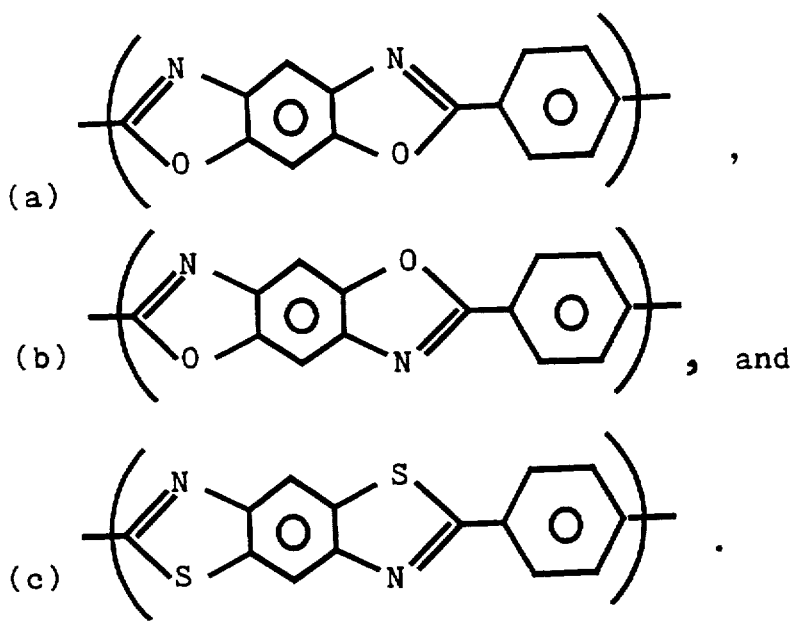

Signed and Sealed this

Third Day of October, 1995

Attest:

BRUCE LEHMAN

Attesting Officer     Commissioner of Patents and Trademarks